United States Patent [19]

Miguel

[11] 4,404,889
[45] Sep. 20, 1983

[54] COMPOSITE FLOOR ARMOR FOR MILITARY TANKS AND THE LIKE

[75] Inventor: Anthony S. Miguel, Leucadia, Calif.

[73] Assignee: The United States of America as represented by the Secretary of the Army, Washington, D.C.

[21] Appl. No.: 297,295

[22] Filed: Aug. 28, 1981

[51] Int. Cl.³ .............................................. F41H 5/04
[52] U.S. Cl. .................................... 89/36 A; 428/911
[58] Field of Search ............ 89/36 A, 36 H; 244/121, 244/158 A; 428/911, 593; 109/82, 83, 84

[56] References Cited

U.S. PATENT DOCUMENTS

| | | | |
|---|---|---|---|
| 3,575,786 | 4/1971 | Baker et al. | 244/121 |
| 3,604,374 | 9/1971 | Matson et al. | 89/36 A |
| 3,699,842 | 10/1972 | Grewing et al. | 89/36 H |
| 3,806,928 | 4/1974 | Costanza | 343/18 A |
| 4,198,454 | 4/1980 | Norton | 89/36 A |

FOREIGN PATENT DOCUMENTS

| | | |
|---|---|---|
| 1120939 | 12/1961 | Fed. Rep. of Germany . |
| 2411678 | 9/1975 | Fed. Rep. of Germany ..... 89/36 A |
| 81920 | 12/1918 | Switzerland . |
| 2041178 | 9/1980 | United Kingdom ............... 89/36 A |

OTHER PUBLICATIONS

*The Condensed Chemical Dictionary*, 9th Edition, Gessner G. Hawley; 1977; p. 581.
*Ballistic Materials and Penetration Mechanics*, Roy C. Laible; 1980; p. 150.

Primary Examiner—Stephen C. Bentley
Assistant Examiner—Maureen Ryan
Attorney, Agent, or Firm—Peter A. Taucher; John E. Becker; Robert P. Gibson

[57] ABSTRACT

A novel composite armor for armored vehicles which attenuates mine blast loading better than monolithic steel armor plate of equal areal density without structural fracture. The disclosed composite armor, particularly used as vehicle floor armor, is designed so as to greatly enhance not only crew survivability, by markedly reduced compressive shock effect, but also vehicular integrity. The novel composite armor in most preferred embodiments comprises layers of high density steel honeycomb, balsa wood, and ballistic-resistant nylon such as KEVLAR, sandwiched in various arrangements between outer layers of steel armor plate.

17 Claims, 8 Drawing Figures

COMPOSITE FLOOR ARMOR FOR MILITARY TANKS AND THE LIKE

GOVERNMENT INTEREST

The invention described herein may be manufactured, used, and licensed by or for the Government for governmental purposes without payment to me of any royalty thereon.

BACKGROUND AND SUMMARY OF THE INVENTION

Composite armor materials appeared during World War II as flak suits (nylon-steel) which weighed about 4.5 lb/ft$^3$ (0.07 g/cm$^3$). Although significant improvements therein have evolved thereafter and more particularly since the Korean War with development of lightweight non-metallic materials (ballistic nylon, fiberglass reinforced plastic), relatively lesser improvements appear to have evolved in the realm of blast protection for armored vehicles and their occupants. Combat experience has shown that tanks can readily be put out of action by blast forces from land mines. The blast defeat mechanisms attributed to land mine explosions are shock, deformation, fracture and overturn. Armor design of tank floors heretofore apparently has been based primarily only on the criterion that the armor not fracture as a result of a nominal "belly" mine blast loading. It appears that the blast induced dynamic response of the floor upon crew members and other critical operational components until more recent years has not received as much continuing attention as desirable to provide better data to evaluate and to improve tank floor armor so as to improve the overall mission survivability of tanks.

Some tank floor armor currently is made of class 2 rolled homogeneous armor plate intended for use where maximum resistance to structural failure under conditions of high rate of shock loading is required, and where resistance to armor piercing ammunition is of secondary importance. Unfortunately, the history of design related analyses and tests has been such that the majority of design information generated is based on the response of a variety of steel plates tested with unclamped edge support. Engineering design equations have been developed which predict permanent plate deformation and fracture as a function of thickness. Recent studies have shown that transient plate response can now be predicted with the aid of certain computer codes.

Until the last few years, little regard was given to the relationship between tank floor design and tank mission effectiveness. With the advent of survivability/vulnerability methodology being imposed upon combat vehicle designs, new questions must now be answered relative to component dynamic interactions within vehicles subjected to extreme explosive blast loading environments.

It has been suspected for some time that the dynamic response of tank floor armor plate was probably large enough to incapacitate the crew members even if the tank floor was not fractured. Tank crews have been found to be vulnerable from two types of tank floor-induced loadings, both of which are functions of transient floor displacement. One loading is a mechanically induced shock which can cause body damage resulting from the relative movement of the various human organs. The second loading is overpressure within the tank compartment created by the shock wave in the air generated by the tank floor deformation. This overpressure is also potentially damaging to the human organs and more particularly to the air-containing organs induced by the rapid gross relative deformation of body tissue. Obviously the tolerance limits to a shock wave are different for different parts of the body. Eardrums usually are the first to rupture, followed by damage to the lungs. It is also known that armor thickness is proportional to permanent plate deformation and that the thicker the steel plate, the better its capability to attenuate shock loads. It has been estimated that the step velocity response of the armor floor can be represented by a velocity step input of 340 ft/s (104 m/s). It is now well known that this magnitude of velocity step would readily incapacitate an unprotected tank crew member.

There is calculated speculation that an unprotected tank crew member will not survive the dynamic response attendant mine blasts which generate a step velocity change of 15 ft/s (4.6 m/s) over a duration of one millisecond. Since the dynamic response of a tank floor subjected to a mine blast is quite violent, current practice is to suspend or try to isolate the crew member off from the tank floor such as in shock-absorbing seats. This solution to the problem of crew member survivability is now being reexamined.

Crew member survivability studies and similar closely related studies directly pertinent to tanks subjected to mine blasts have been made. Shock isolation requirements that the tank crew member seats must meet if injury is to be avoided are given in various published crash design handbooks. The data reported in these references has been generated from volunteers, accident reports, and human simulators such as animals, anthropomorphic dummies, and cadavers. As might be expected, the wide variation in the physiological and psychological structure of humans precludes a simple prediction of injury that will occur as a function of shock loading. Further insight into the uncertainties associated with predicting/measuring crew member survivability has evolved. The point being made is that suspending the crew member above the floor, while desirable and potentially beneficial, does not necessarily ensure that he will not be incapacitated as a consequence of a mine blast.

It is proposed that survivable dynamic response requirements be based on the mission survivability of a tank. In this manner, the survivability of the crew member is preeminent since he is the most critical system component. Intrinsic to this approach is that the survivability of a crew member is dependent upon other critical components functioning after a land mine blast. The degradation of tank mission effectiveness can range from significant fracture of structure (such as optics) to the generation of noise in electronic circuitry. Such degradation is believed to result in greater vulnerability to enemy attack and hence lowering of crewman survivability.

If it is assumed that all critical components within a tank are of equal importance for crew member survival of a mine blast, then the survivable dynamic response design requirements are such that the tank floor armor must absorb and redistribute the blast load in a relatively mild manner. In principle this goal is considered to be achievable if space is made available to use shock isolation materials in composite structural configurations. Three particular materials tested and found to be satisfactory for use along with other materials in such novel hybrid composite armor are high strength steel honeycomb, balsa wood and a ballistic-resistant fabric, such as KEVLAR nylon.

As a consequence of this goal, it is the primary object of this invention to evolve a novel composite armor embodying novel combinations of various known media, the various combinations of which are designed not only to defeat land mine blast loadings, but also to enhance vehicular integrity against shaped charges, projectiles and irradiation.

It is a further object of the present invention to evolve the aforedescribed novel composite armor which will contribute markedly to the reduction of the highly damaging mechanical and overpressure compressive shock effect on the crewmen of tanks or other armored vehicles utilizing this novel armor.

These and other objects and advantages will become more apparent from the following more detailed description considered in conjunction with the accompanying drawing figures.

DETAILED DESCRIPTION OF INVENTION

Figure 1:
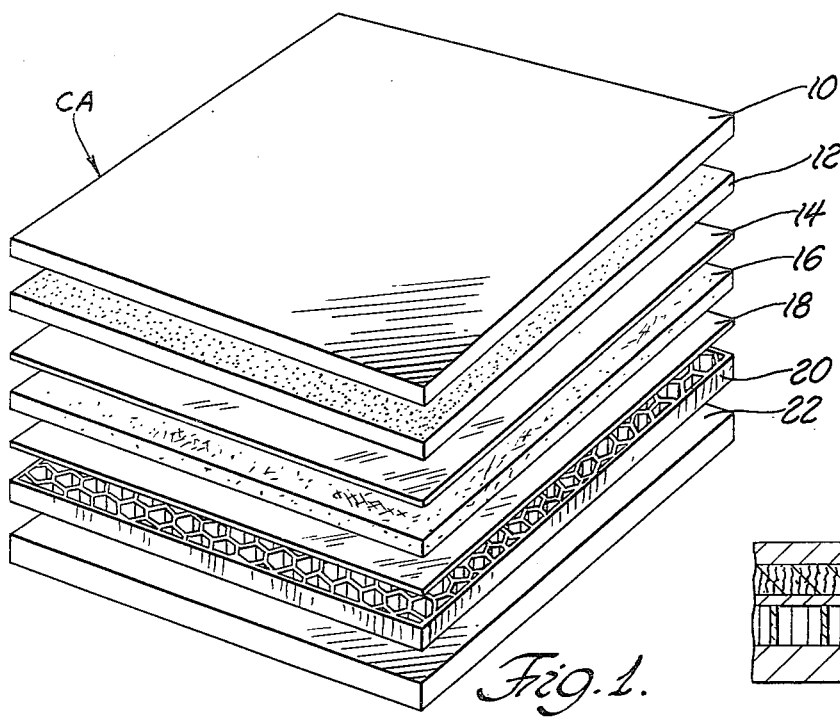
FIG. 1 is a perspective fragmentary representation of one preferred composite floor armor showing the material layers in partially separated relationship for clarity.

In the FIG. 1 embodiment, the illustrated form of composite floor armor is generally designated CA and clearly shows one preferred arrangement of the various energy absorbing media utilized therein. In their order from inside to outside surfaces, they include a 4130 $R_c$ 30 steel plate 10 which is approximately 0.5 inch thick with an areal density of approximately 20.4 lb/ft$^2$, a balsa wood layer 12 having an approximate 0.5 inch thickness and an areal density of 0.52 lb/ft$^2$, a mild steel foil-like membrane 14 of approximately 0.01 to 0.04 inch thickness having an areal density of approximately 1.64 lb/ft$^3$, a ballistic-resistant reinforced fabric layer 16, which may be of a type known by the trademark KEVLAR nylon, and whose thickness is preferably between 0.50 to 0.76 inch thick having an areal density of about 3.8 lb/ft$^2$, another mild steel foil-like layer 18 like the layer 14, a layer of steel honeycomb 20 having a thickness of approximately 0.6 inch with an areal density of approximately 5.3 lb/ft$^2$, and another outer armor plate layer 22 of 4130 $R_c$ 30 steel plate. This outer steel layer 22 which is exposed to the blast is also 4130 $R_c$ 30 steel plate but is approximately 0.75 inch thick having an areal density of approximately 20.2 lb/ft$^2$.

An exemplary high strength steel honeycomb having from about ¼ inch to 1 inch hexagonal cells is considered to be feasible for at least one of the multiple layers making up this improved composite armor. For the one-quarter scale tests, the size of the cells ranged from about 1/16 inch to ¼ inch. In some embodiments, two separated layers of the steel honeycomb may be combined with the other layers and will be further described hereinafter. The honeycomb layer 20 functions to attenuate the blast by deforming in response to the blast shock. For some embodiments, the honeycomb cells may be filled with from about 60–100% microsphere-elastomer composite or matrix or similar material which gives some additional ability to absorb and deflect the blast force, thus breaking up the attendant stress waves. Microspheres are commonly known by those familiar in the art as being very small, thin walled, hollow spheres made of plastic or glass, developed and patented in the mid 1950's and early 1960's. The composite armor hereof which utilizes intermediate layers of the balsa wood, high strength steel honeycomb, and KEVLAR fabric, are considered the best suited to defeat shaped charges and projectiles, and are much superior over the monolithic armor of same areal density. The types of filler for the honeycomb may be varied depending upon whether it is the intent to combat nuclear, biochemical or explosion and fire threats.

Interest in the use of high density steel honeycomb as a blast isolator was stimulated and encouraged by prior test results in which steel plate sandwiched honeycomb of density greater than 30 lb/ft$^3$ (0.48 g/cm$^3$) could survive mine blast without structure fracture. Tests of one-quarter scale models of the present novel composite armor indicate that when subjected to initial velocity changes of the degree induced by conventional mine blast loading, such as on the order of 650 ft/sec, such an arrangement exhibited a marked increase in ability to dissipate energy over that exhibited by stainless steel honeycomb sandwiched merely between monolithic steel plates. Relative to the present novel composite armor hereof, when the steel honeycomb is further filled with the aforesaid microsphere-mixed elastomer, it exhibits a slightly greater ability to dissipate energy than does the unfilled steel honeycomb. However, it was also found that use of dead air space between predetermined spaced apart layers of at least two of the various composite layers would also help attenuate the blast force more satisfactorily than heretofore known monolithic space armor.

Balsa wood was considered a candidate because its specific energy absorption was nearly equivalent to that of steel honeycomb for static loading conditions. It must be noted in passing that this thickness was only experimental and may be greater or lesser depending upon the particular design requirements. Furthermore, when compressed, balsa wood does not squeeze out or spread laterally, at least to any perceptible or significant extent. Additionally the spring back of balsa wood is negligible when disposed so that the grain is parallel to the load. Thus, the layers of balsa wood must be machined or otherwise cut into slabs whose major plane is normal to the grain. This special property serves to provide the space necessary for the other materials, i.e., especially the adjacent layer of ballistic nylon or KEVLAR, to absorb blast energy. It should be noted that other suitable energy absorbing media could be used, such as a rubber pad or an air space, and preferably in combination with one or more adjacent layers of a fiber/fabric reinforced ballistic nylon such as the aforesaid KEVLAR. The only criteria is that the media used have a specific energy absorption quality nearly equivalent to that of the aforementioned steel honeycomb for static loading conditions.

The potential of composite armor to absorb blast loading energy is enhanced by the use of said KEVLAR nylon as a material which can readily stretch and not fracture. The KEVLAR nylon material found to be very acceptable comprises basically a woven nylon having a roving weave which preferably is impregnated with 20% microspheres/elastomer. As used herein, it should be unbonded to the other adjacent materials between which it is sandwiched so it is free to respond to any shock waves attendant to the blast.

The function of the steel honeycomb whether unfilled or filled with crushable microspheres/elastomer is to slow down the motion of the cover plate and to attenuate the transmitted shock waves and associated reflected waves by means of crushing, refraction, reflection and viscoelastic phenomena. The aforesaid use of the foil-like steel membranes on both sides of the honeycomb and KEVLAR serves to cushion the motion of the honeycomb against the respective layers of balsa wood 12 and the KEVLAR nylon layer 16 via membrane action. The inherent crushable, viscoelastic behavior of the KEVLAR material is expected to further attenuate the transmitted stress waves. Since the KEVLAR nylon material herein is not bonded on either side to the steel membrane separators, it is free to move and absorb/slow down the stress waves and honeycomb loading. Use of the first-mentioned, foil-like steel membrane 14 encourages a uniform load to be transmitted to the intermediate balsa wood layer 12. The balsa wood serves to allow the KEVLAR nylon when under a blast-generated strain to further absorb the attenuated residual energy to the vehicle hull plate. This allows the steel hull plate to react to a nominal load of longer duration, as compared to the initial impulse loading history. Furthermore, much of the blast loading will be diffused into the vehicular structure in a relatively uniform manner. Test data shows that the structural response of the subject novel composite armor is superior to that of a monolithic steel armor of equivalent areal density, and furthermore, the shock isolation thereof is found to be significantly greater than that of the equivalent areal density steel armor. Thus, by arranging the aforedescribed material between two outer plates of 4130 $R_c$ steel, attenuation of the blast force can be absorbed to a great extent and thereby reduce the compression shock transmitted to the crew compartment. Thus, crew survivability and tank mission effectiveness are greatly enhanced. Each of these energy absorbing media was considered because of their respective energy absorbing abilities to attenuate the explosive blast forces and irradiation.

The foregoing description relates to and is reasonably representative of either of plates P9 or P10, whose quarter scale data is set forth in the TABLE A hereinafter.

The following chart, which is identified as TABLE A, illustrates a quarter scale comparison of some fifteen different plates, of which plates P1, P2, P6, and P11 are monolithic steel plates. The other remaining eleven plates are representative of some of the varying novel composite laminates. The illustrative drawing FIGS. 2-8 inclusive are representative of several variations of the composite armor plates. While some of these illustrated composite plate assemblies are listed in the chart, others of the illustrated embodiments are not so listed.

TABLE A

CANDIDATE MATERIAL COMBINATIONS FOR COMPOSITE BLAST ARMOR

| Plate Test Number | Quarter Scale Dimensions Used Composite Plate Materials | | | | | | | Total Plate Thickness (inch) | Total Plate Weight (pounds) | Plate Areal Density Pounds/ft$^2$ |
| --- | --- | --- | --- | --- | --- | --- | --- | --- | --- | --- |
| | 1 | 2 | 3 | 4 | 5 | 6 | 7 | | | |
| P1 | — | — | — | — | — | — | S-0.25 | 0.25 | 40.4 | 10.1 |
| P2 | — | — | — | — | — | — | S-0.313 | 0.313 | 50.6 | 12.7 |
| P3 | S-0.125 | B-0.156 | S-0.010 | — | — | HF-0.160 | S-0.188 | 0.69 | 60.8 | 15.2 |
| P4 | S-0.125 | HF-0.160 | S-0.010 | — | S-0.010 | HF-0.140 | S-0.188 | 0.72 | 65.2 | 16.3 |
| P5 | S-0.125 | HF-0.160 | S-0.010 | — | S-0.010 | HU-0.160 | S-0.188 | 0.73 | 59.2 | 14.8 |
| P6 | — | — | — | — | — | — | S-0.375 | 0.375 | 60.6 | 15.2 |
| P7 | S-0.125 | B-0.156 | S-0.010 | B-0.156 | S-0.010 | B-0.156 | S-0.188 | 0.801 | 57.0 | 14.3 |
| P8 | S-0.125 | A-0.5 | — | — | — | — | S-0.188 | 0.813 | 50.6 | 12.7 |
| P9 | S-0.125 | B-0.156 | S-0.010 | K-0.165 | S-0.010 | HF-0.140 | S-0.188 | 0.794 | 61.75 | 15.4 |
| P10 | S-0.125 | B-0.156 | S-0.010 | K-0.192 | S-0.010 | HU-0.160 | S-0.188 | 0.841 | 61.5 | 15.4 |
| P11 | — | — | — | — | — | — | S-0.25 | 0.25 | 40.4 | 10.1 |
| P12 | S-0.125 | — | — | A-0.25 | S-0.010 | HF-0.160 | S-0.188 | 0.733 | 55 | 13.8 |
| P13 | S-0.125 | K-0.192 | S-0.010 | K-0.192 | — | — | S-0.188 | 0.707 | 57.5 | 14.4 |
| P14 | S-0.125 | B-0.159 | S-0.010 | A-0.25 | S-0.010 | K-0.146 | S-0.188 | 0.886 | 55 | 13.8 |
| P15 | S-0.125 | B-0.159 | S-0.010 | B-0.159 | S-0.010 | K-0.170 | S-0.188 | 0.821 | 57 | 14.3 |

Figure 2:
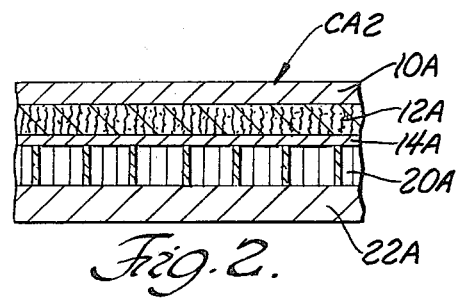
FIGS. 2 through 8 are further similar fragmentary views shown in cross section of additional contemplated modifications of the subject composite armor.

S = steel
B = balsa wood
K = Kevlar
A = air
HF = honeycomb-filled with Stycast CPC-41 containing 60% by volume microspheres
HU = honeycomb-unfilled consists of 1/16 hexigon cell - Hastelloy steel (43.9#/ft$^3$).
— = nothing Referring now specifically to FIG. 2, the composite armor therein is generally designated CA2 and corresponds to plate P3 listed in TABLE A. Commencing from what is normally considered to be the innermost side, armor CA2 comprises the following laminates: the inner potential tank/vehicle floor or wall plate 10A, a balsa wood layer 12A, a mild steel foil or similar membrane layer 14A, a steel honeycomb layer 20A, and the heavier gauge outermost steel plate 22A. Both the inner and outer steel plates of these various embodiments may be also fabricated from the 4130 $R_c$ 30 armor steel plate or equivalent strength material, the relative thicknesses of which may be of the approximate ranges stated hereinbefore or scaled up from the quarter scale sizes given in TABLE A.

Figure 3:
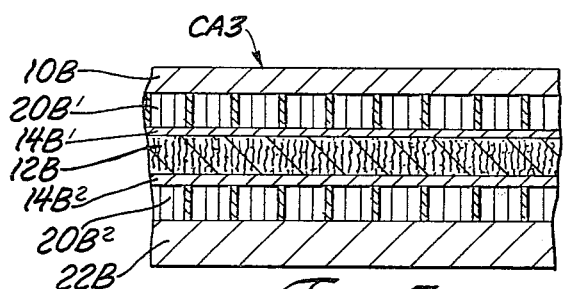

Whiles plates P4 and P5 in TABLE A are slight variations of each other, their composite layers have not listed a balsa wood layer. FIG. 3 represents a variation of said P4 and P5 plates in that it shows a balsa wood layer centrally sandwiched among its components. Thus, the composite armor therein is designated CA3 and comprises innermost plate 10B, a first steel honeycomb layer 20B$^1$, a first mild steel foil-like layer 14B$^1$, a balsa wood layer 12B, a second mild steel foil-like layer 14B$^2$, a second steel honeycomb layer 20B$^2$, and the outermost steel plate 22B. It is contemplated that in addition to omitting the balsa wood layer as per plates P4 and P5 in TABLE A, still a further contemplated variation from that shown in FIG. 3 would be the substitution of an air space in place of the balsa wood layer 12B.

Figure 4:
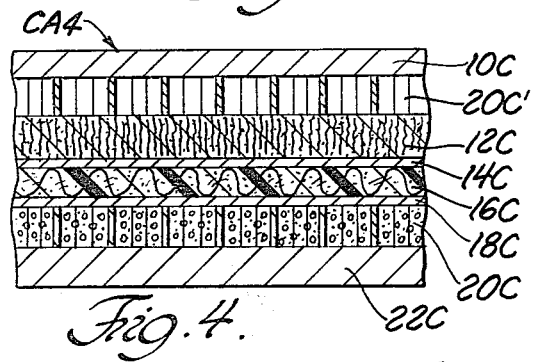

A still further variation from that of FIGS. 1-3 is that contemplated in FIG. 4. The composite armor CA4 therein is more closely similar to the arrangement of that of FIG. 1 and differs therefrom basically by the addition of a second honeycomb layer $20C^1$ outwardly adjacent the innermost layer 10C. The other corresponding layers have the same identifying reference numerals but with the suffix C, which correspond to their counterparts in FIG. 1. The outermost layer 20C of the honeycomb material is shown herein with its cells being at least partially filled with the crushable elastomer microspheres.

Figure 5:
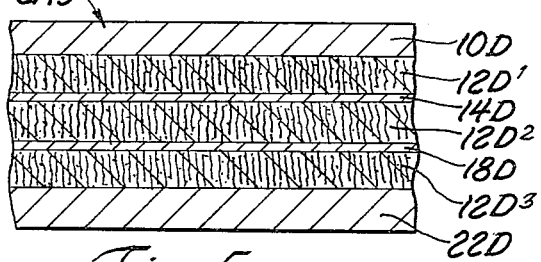

FIG. 5 depicts another variation which is representative of the plate P7 in TABLE A. The composite armor therein is generally designated CA5 and comprises an innermost steel plate 10D, a first balsa wood layer $12D^1$, a first mild steel foil-like layer 14D, a second balsa wood layer $12D^2$, a second foil-like layer 18D, a third balsa wood layer $12D^3$, and the heavier outermost steel plate 22D. Another variation thereof would be to substitute a layer of the steel honeycomb for one or more of the three balsa wood layers. Also, while the three layers of balsa are shown and listed as having essentially identical thicknesses, it is contemplated that one or more various density layers thereof may be of a different relative thickness. It is to be noted that the slabs or layers of the balsa wood are to be oriented with the grain thereof disposed perpendicular to the major planes of the inner and outer laminates or plates. The total plate weight given in TABLE A was for the respective test plates measuring 2'×2' used for quarter scale testing.

Figure 6:
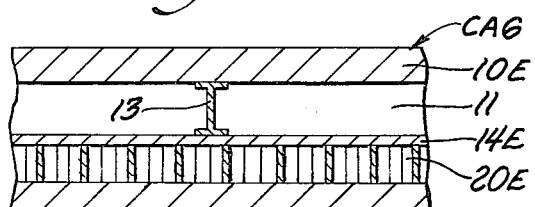

In FIG. 6, the composite armor is generally designated CA6, and corresponds to the plate 12 of TABLE A. It comprises inner and outer steel plates 10E and 22E respectively which are separated by collective layers of an air space 11, mild steel foil or membrane layer 14E, and the steel honeycomb layer 20E. In this embodiment, the air space is substituted for a layer of balsa wood. The air space 11 should be of sufficient thickness so as to act as a cushion to help attenuate the blast force loading. Crushable supports or spacers 13 may be optionally used to help separate the steel plate 10E from the contiguous layers of steel foil 14E and steel honeycomb 20E. In some of the other embodiments, the air space may be also used in place of the honeycomb or balsa wood layers.

Figure 7:
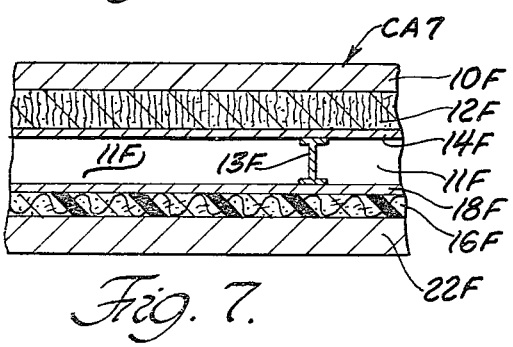

Proceeding to the embodiment in FIG. 7, the composite armor thereof is generally designated CA7, and corresponds to plate 14 of TABLE A. It is comprised of inner and outer steel plates 10F and 22F, corresponding to plates 10 and 22 of the FIG. 1 embodiment. Sandwiched in between these plates commencing from plate 10F are balsa wood layer 12F, mild steel foil layer 14F, air space 11F with optional crushable supports 13F, another of the foil layers 18F, and the layer 16F of ballistic nylon such as KEVLAR. The KEVLAR is such as to preferably have the fiberglass woven roving impregnated with predetermined amounts such as 20%, microspheres/elastomer and adhesive. Another suitable style of the Dupont KEVLAR is that known as KEVLAR 49 fabric (style 1033) 1420 denier, 15 oz/sq yd weight, 40×40 count, 8×8 basketweave impregnated with Emerson and Cuming's Stycast (TM) CPC 41 to achieve an areal density of 0.94 lb/ft². The crushable, viscoelastic behavior of the KEVLAR and adhesive acts to further attenuate transmitted stress waves, in conjunction with the attenuation provided by the balsa wood layer 12F and air space 11F.

Figure 8:
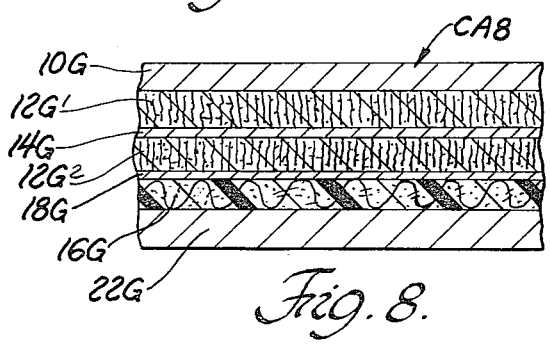

FIG. 8 represents a still further variation of composite armor denoted CA8. It is representative of the plate P15 listed in the foregoing TABLE A. The innermost plate is designated 10G, and the outermost plate is 22G. Sandwiched between them progressively from the innermost side are a first balsa wood layer $12G^1$, a first mild steel foil layer 14G, a second balsa wood layer $12G^2$, a second mild steel foil layer 18G, and a layer of the ballistic nylon, such as KEVLAR 16G. It is also contemplated that the first-stated balsa wood layer $12G^1$ may be replaced by a layer of the steel honeycomb.

The steel honeycomb material, with its ¼" to 1" size hexagon cells unfilled, may be that known as Hastelloy-X (AMS-5536) steel (43.9 lb/ft³). When the honeycomb cells are filled, it may be done with various suitable materials to help slow down the motion of outer plate (when subjected to the blast force) and to also help attenuate the transmitted shock waves and associated reflected waves. One such filler material found to work quite successfully is that known as Stycast (TM) CPC-41 by Emerson and Cuming which forms a matrix containing crushable microspheres/elastomer. Another such filler material is a product known as Eccosphere ® (1G-101) put out by the same company. Eccospheres are similar to or represent a form of the microspheres, in that they also are very small hollow glass, ceramic, or plastic spheres. Combinations of these materials, such as about 60-65% of the latter and 35-40% of the former, may be used to fill the cells. The steel honeycomb layers 20 (FIG. 1) or 20B (FIG. 3) should be of sufficient thickness and strength so that it is at least equal to the balsa wood layer shown in FIG. 1, i.e., plate 10 from TABLE A, to help attenuate blast loadings.

From the results achieved with one quarter scale tests of the various composite armors comparing them to various monolithic plate armor, it was concluded that the test data derived was reasonably valid and representative of contemplated full scale model prototypes from the standpoint of being better able to withstand and attenuate blast force deformation whether from land mine or shaped charge detonations and the attendant stresses and/or irradiation effects thereof.

The quarter scale tests were conducted with 2'×2' test plates clamped along their four sides in a suitable test fixture which was also scaled in overall weight from a projected 51-ton tank vehicle. The hold-down ratio of the test fixture to framing fixture (i.e., the frame used to clamp or hold the test plate) was selected at approximately 28:1. The exposed area of the respective test plates was set to react against proportionately sized blast charges, the latter being scaled down from a 22 lb (10 Kgm) explosive charge.

For some of the more preferred projected armor prototypes to be evolved from the scaled tests used in the development of these composite armors, exemplary statistics of the preferred parameters are that the various more substantive laminates vary in relative thickness and areal density from one another, that the overall thickness of the finished composite armor for some vehicles to combat certain given mine threats preferably not exceed about a 3 inch (7.6 cm) thickness, that the areal density not exceed 65 lb/ft² (320 kg/m²) which is equivalent to about 1.5 inch thick steel, that the outer cover plate be steel armor not less than ¾ inch (1.9 cm)

thickness, and that the inner hull plate be steel armor not less than about ½ inch thick. For use as other type armor in general, other thicknesses would be evolved depending upon the various envisioned threats and needs thereof.

Accordingly, from the foregoing detailed description it is apparent that the disclosed novel combinations of various laminates and media has evolved a much improved family of composite laminate armor which well satisfies the aforestated objectives.

While several specific examples of the composite laminated armor have been described and shown, it is apparent that other variations of the present invention may be made by those skilled in this art without departing from the spirit and scope of this invention as defined in the appended claims.

I claim:

1. A novel composite armor assembly adaptable for use in belly hulls and walls of various vehicles to protect its personnel and other vital compartments, said composite armor assembly comprising a plurality of at least two intermediate layers of various kinetic-energy-absorbing media of differing densities contained between innermost and outermost layers of armor steel plate; and at least one of said intermediate media layers including a balsa wood layer being cut and disposed so that its grain is essentially perpendicular to major planes of the assembled composite layers and is essentially parallel to the major force direction of a potential explosive shock wave load.

2. The composite armor as defined in claim 1, wherein each of said media layers has an areal density of predetermined value such that the collective areal density of the composite armor assembly is of a value up to about 65 lbs./ft.$^2$ for a thickness of up to 3", and is essentially equivalent to that of a predetermined correlated thickness of prior art monolithic steel armor having a thickness of from approximately one-third to one-half of that of this novel composite armor, and whereby said armor assembly is characterized by a structural and shock isolation value significantly greater than that of prior art monolithic steel armor having an essentially equivalent areal density.

3. The composite armor as defined in claim 1, wherein said kinetic-energy-absorbing media layers are of various predetermined thicknesses and elastic properties so that the armor assembly can readily attenuate a mine blast loading value having a velocity step input of between 340 and 650 ft/sec.; and is such that a step velocity change of less than a presumably fatal rate of 15 ft/sec over a duration of one millisecond (4.6 m/s) is imparted within the vehicle compartments, when subjected to a detonation blast loading of up to the 650 ft/sec. value of an antitank type mine charge of a size up to about 22 lbs (10 kgm).

4. The composite armor of claim 1 wherein said media layers includes at least one layer of ballistic-resistant fabric of a type having a woven roving weave impregnated with a reinforcing matrix of microspheres and a strengthening elastomer, said fabric being of the type known in the trade as KEVLAR nylon.

5. The composite armor assembly of claim 4 wherein the said intermediate plural layers further include at least one layer of steel honeycomb.

6. The composite armor assembly of claim 5, wherein the said steel honeycomb layer is further sandwiched between mild steel foil-like media layers.

7. The armor assembly of claim 1, wherein said two armor steel plates between which said intermediate kinetic-energy-absorbing media are contained are fabricated of 4130 $R_c$ 30 steel.

8. The composite armor assembly as defined in claim 5, wherein in addition to said group of intermediate layers, the assembly includes at least a pair of layer-separating mild steel foil-like membranes, and the progressive order of said layers commencing from interior to exterior is as follows:
   a. 4130 $R_c$ 30 steel plate,
   b. balsa wood,
   c. mild steel foil membrane,
   d. ballistic-resistant reinforced fabric,
   e. mild steel foil membrane,
   f. steel honeycomb, and
   g. 4130 $R_c$ 30 steel plate of heavier gauge than the first-mentioned steel plate.

9. The armor assembly of claim 5, wherein said honeycomb media is filled with 60% microsphere elastomeric material.

10. The composite armor of claim 5 wherein the said interior steel plate is thinner than both the exterior steel plate and the thickness of any of the layers of balsa wood, steel honeycomb, and ballistic-resistant fabric.

11. The composite armor of claim 8, wherein said layer of balsa wood is planar in form and approximately the same thickness as said innermost steel plate.

12. The composite armor of claim 5, wherein said KEVLAR nylon layer is of approximately the same thickness as said innermost steel armor plate, said KEVLAR nylon layer being sandwiched between two mild steel foil-like membranes of equal thickness, said membranes being unbonded to said KEVLAR nylon layer and acting to cushion the potential motion of at least one adjacently disposed layer of honeycomb media against said KEVLAR nylon layer, whereby said KEVLAR nylon layer is adaptable to freely move, and absorb and reduce blast-imparted stress waves and honeycomb loading; and wherein at least one of said mild steel foil-like membrane layers acts to help uniformly transmit a potential blast load upon an adjacently disposed media layer of balsa wood.

13. The composite armor according to claim 5, wherein each of said honeycomb media layers used therein is of high density and has a density greater than 30 lbs/ft$^3$, and said honeycomb being constructed such that it is capable of attenuating any transmitted shock waves and associated reflected waves by means of crushing, refraction, reflection and viscoelastic phenomena, thereby greatly dissipating the energy of the blast; and whereby said kinetic-energy-absorbing layered media being arranged in such a manner as to cumulatively and collectively absorb and redistribute a blast load in a relatively milder manner and to thereby conduct that force more evenly to the hull of the vehicle.

14. The composite armor as defined in claim 8, wherein the respective composite layers have the following range of relative thickness:
   a. 4130 $R_c$ 30 steel plate, of about 0.5 inch thickness
   b. balsa wood, of about 0.62 inch thickness
   c. mild steel foil membrane, of about 0.10 to 0.04 inch thickness
   d. ballistic-resistant reinforced fabric, of about 0.66 inch thickness
   e. mild steel foil membrane, of about 0.10 to 0.04 inch thickness f. steel honeycomb, of about from 0.56 to 0.64 inch thickness, and g. 4130 R$_c$ 30 steel plate of heavier gauge than the first-mentioned steel plate, of about 0.75 inch thickness.

15. A novel composite armor assembly adaptable for use in belly hulls and walls of various vehicles to protect its personnel and other vital compartments, said composite armor assembly comprising plural intermediate layers of various kinetic-energy-absorbing media of differing densities contained between innermost and outermost layers of armor steel plate; said intermediate layers including media layers of balsa wood, steel honeycomb, and an at least semiflexible reinforced ballistic-resistant fabric, and wherein said layer of balsa wood is planar in form and approximately the same thickness as said innermost steel plate, with said balsa wood layer being cut and disposed so that its grain is essentially perpendicular to major planes of the assembled composite layers and is essentially parallel to the major force direction of a potential explosive shock wave load.

16. The armor assembly of claim 15, wherein said two armor steel plates between which said intermediate kinetic-energy-absorbing media are contained are fabricated of 4130 R$_c$ 30 steel.

17. The armor assembly of claim 15, wherein said ballistic-resistant fabric is of a type having a woven roving weave impregnated with microspheres and a strengthening elastomer, said fabric being of a general type such as known in the trade as KEVLAR nylon.

* * * * *